(12) United States Patent
Shelley (10) Patent No.: US 7,219,164 B2
(45) Date of Patent: May 15, 2007

(54) MULTIMEDIA RE-EDITOR

(75) Inventor: James D. Shelley, Coral Gables, FL (US)

(73) Assignee: University of Miami, Miami, FL (US)

(*) Notice: Subject to any disclaimer, the term of this patent is extended or adjusted under 35 U.S.C. 154(b) by 778 days.

(21) Appl. No.: 10/147,796

(22) Filed: May 17, 2002

(65) Prior Publication Data

US 2003/0217330 A1 Nov. 20, 2003

(51) Int. Cl.
*G06F 15/16* (2006.01)

(52) U.S. Cl. .................... 709/246; 709/217; 715/501.1

(58) Field of Classification Search ................. 709/246
See application file for complete search history.

(56) References Cited

U.S. PATENT DOCUMENTS

| | | | |
|---|---|---|---|
| 5,826,025 A | | 10/1998 | Gramlich |
| 5,903,727 A | | 5/1999 | Nielsen |
| 5,905,991 A | * | 5/1999 | Reynolds .................. 715/501.1 |
| 6,073,133 A | * | 6/2000 | Chrabaszcz .................. 709/200 |
| 6,324,511 B1 | | 11/2001 | Kiraly et al. |
| 6,370,498 B1 | * | 4/2002 | Flores et al. .................. 715/536 |
| 6,546,385 B1 | * | 4/2003 | Mao et al. ................... 715/500 |
| 6,732,090 B2 | * | 5/2004 | Shanahan et al. ........... 715/500 |
| 2002/0129057 A1 | * | 9/2002 | Spielberg ..................... 707/512 |

FOREIGN PATENT DOCUMENTS

| | | | |
|---|---|---|---|
| WO | WO 99/50744 A1 | * | 10/1999 |
| WO | WO 00/07110 A1 | | 2/2000 |

OTHER PUBLICATIONS

Douglas A. Downing et al., Dictionary of Computer and Internet Terms, 1998, Barrons's Educational Series, Inc., 6th Edition, pp. 115-117.*
*LMSOFT Presenter Press Room:* S. T. Plain, *LMSOFT Presenter 3.0 Successfully Demystifies a Traditionally Challenging Task*, "PC Magazine", (Jan. 19, 1999); Altman,*Powerful LMSOFT Presenter Gets User-Friendly Makeover Scores 4*, "Presentations Magazine", (Jan. 15, 1999); S. J. Johnston, *Quote from Easy Presentations*, "Information Week", (Dec. 14, 1998); and, C.R. Celis, *Quote from Moving Pictures*, "Inc. Technology", (Nov. 19, 1998).
F. Robles, *Computer Teaching Languages?*, The Miami Herald, (Oct. 25, 1993).

* cited by examiner

*Primary Examiner*—Patrice L. Winder
(74) *Attorney, Agent, or Firm*—Christopher & Weisberg, P.A.

(57) ABSTRACT

A method and system for processing a re-editable multimedia document. A method for processing a re-editable multimedia document can include the steps of loading an electronic text file; associating at least one external multimedia element with a selected portion of the loaded electronic text file; storing the association in a separate electronic attributes file; and, responsive to a user-activation of the selected portion of the loaded electronic text file, invoking the at least one associated external multimedia element. The method can further include optically scanning a printed textual document; and, converting the scanned printed textual document into the electronic text file. Finally, the loading step can including loading the electronic text file from an optical disk.

22 Claims, 11 Drawing Sheets

| R | REdit | | |
|---|---|---|---|
| File | Mode | Attributes | |

550 ─── Cats enjoy vo​ | View | ​eir | Attach Sound | seem never to
rest. These c​ | Edit ✓ | ​w i​ | | ​vening.
Click here to lis​ | | ​ca​ | Attach Video | by a cat
often can indicate the cat'​ | | | Attach Text | s not adequately
310 ─── ​satisfied the needs of the​ | | | | ​ghtfully entitled
to such needs. | | | Make User Record Area | |

Some cat owners exacerb​ | Make User Text Input Area | ​eowing by
holding the loquacious kit​ | | ​m.
| 330
Instead, some veterinaria​ | Edit/Attribute ✓ | ​ing an incorrigible
feline as follows: "Kitty, it is in​appropriate for you to carry on in this way.
I insist that you condu​c​

Edit Attributes

Text Range

From: 631    To: 667

File: d:\sound\wavefiles\meow.wav    [Browse]

From: 00:00.0    To: 00:06.72    [Play]

Type:         Key:    Status Bar Text:
waveaudio ▼   F2 ▼   Meow

[Attach]   [Cancel]

MULTIMEDIA RE-EDITOR

BACKGROUND OF THE INVENTION

1. Statement of the Technical Field

The present invention relates to the field of multimedia authoring and more particularly to a multimedia editor configured to adapt textual documents into multimedia documents.

2. Description of the Related Art

Modern computing has transformed the world of information exchange from primarily a text-based publication model to a multimedia model. While the text-based publication model proved to be somewhat effective for disseminating information to the masses, many complex ideas were best represented through the combination of textual description and audiovisual presentation. In fact, in the absence of a complementary audiovisual presentation, oftentimes the use of textual materials can be outright ineffective in presenting an idea.

For example, the study of human language has always involved the use of textual instruction in conjunction with audiovisual instruction. While classroom instruction had been preferred, in many cases audio cassettes or video cassettes were packaged with textual materials to provide a comprehensive self-study package. Yet, many aspects of the language instruction process are lost upon the student in the absence of a comprehensive presentation involving the concurrent use both of textual materials and audiovisual materials. Specifically, real-time feedback of the student's pronunciation of a vocabulary word in a textual instruction booklet can accelerate the learning process.

The processing power of the personal computer, when combined with the mass storage capabilities of modern media provide new opportunities for combining textual materials with audiovisual supplementary materials. In consequence, content authors have combined text with multimedia elements, such as graphics, animation, music, sound effects and video to produce multimedia documents. Ranging from simple slide shows to full-blown interactive applications, multimedia documents have introduced an entirely new modality for presenting ideas to the masses. Notably, the promise of the multimedia document far exceeds that of its ancestor, the printed book.

Initially, the authoring of a multimedia documents involved substantial expertise in the art and science of computer programming. More recently, however, multimedia authoring tools have been developed which require little more than the manipulation of graphical icons to produce full-fledged multimedia documents. Notably, multimedia authoring tools range from word processing systems having enhanced object manipulation capabilities, to presentation slide-show production tools, to formalized computer based training production tools. In each case, however, it is presumed that the author will produce a multimedia document from scratch. Thus, the vast majority of existing textual content lacks the richness of modern multimedia.

SUMMARY OF THE INVENTION

The present invention is a multimedia re-editor which overcomes the deficiencies of conventional multimedia authoring tools and provides a novel and non-obvious system and method for re-configuring textual documents with multimedia elements to produce a multimedia document. A multimedia re-editor according to the present invention can include a text processor, a multimedia attribute associator and a multimedia processor. The text processor can be configured to read and visually present electronic text contained in a text file. Notably, in one aspect of the present invention, the text processor can be a read-only text processor configured to read and visually present electronic text contained in a text file, but not to permit editing of the electronic text contained in the text file.

The multimedia attribute associator, by comparison, can be configured both to associate selected portions of the electronic text with separately stored multimedia elements, and also to store the associations in an attribute file which is separate from the text file. Finally, the multimedia processor can be configured to invoke multimedia elements associated with activated ones of the selected portions of the electronic text. More particularly, the multimedia processor can determine which multimedia elements to invoke based upon the associations in the attribute file.

Importantly, the multimedia attribute associator can include an interface through which at least one of a sound file, video file, text file, external program, user record area and user text file can be identified for association with the selected portions of the electronic text. The interface further can include a configurable range interface element through which a portion of the multimedia elements can be specified for association with the selected portions of the electronic text. In this way, the multimedia processor need only process a selected portion of an associated multimedia element rather than the entire multimedia element.

A method for processing a re-editable multimedia document can include the steps of loading an electronic text file; associating at least one external multimedia element with a selected portion of the loaded electronic text file; storing the association in a separate electronic attributes file; and, responsive to a user-activation of the selected portion of the loaded electronic text file, invoking the at least one associated external multimedia element. The method can further include optically scanning a printed textual document; and, converting the scanned printed textual document into the electronic text file.

In one aspect of the invention, the associating step can include the step of associating at least one of a sound file, video file, text file, external program, user record area and user text file with the selection portion of the loaded electronic text file. Moreover, the associating step can include specifying a portion of the external multimedia element with the selected portion of the loaded electronic text file. In any case, the loaded electronic text file can include foreign language instruction text. By comparison, the loaded electronic text file can include formal logic instruction text.

Importantly, using the re-editor of the present invention, a dictionary document can be created. Specifically, a re-edited text file can specify a set of words and their corresponding definitions. For instance, an exemplary dictionary document can include the following underlying text:

aardvark—anteater bat—kind of like a flying mouse cat—"a horrible thing . . . " (Bigwig from the Richard Anderson novel "Watership Down")

dog—a creature that chases (some) cats kangaroo—an Australian marsupial that likes to hop meercat—it looks like a cross between a cat and a squirrel mouse—a cute little rodent that is chased by cats rat—a creatue that is chased by cats and dogs wombat—another cute Australian animal
zebra—a horse with stripes As with any other re-edited document, attributes can be added to the words or portions of the words in the dictionary. Thus, sound files can be associated with defined words. These sounds then can be used in word games such as a flash cards game in which the end user can be presented with an arbitrarily chosen defined word. The player can be asked for the definition for the word and can listen to the pronunciation of the word. Subsequently, the definition of the word can be highlighted or otherwise emphasized in the dictionary file.

The multimedia re-editor also can be used to generate sample sentences for use in instructional and educational materials. Specifically, a re-editor document can include grammar rules specified in modified Backus Naur Format. For example:

"first grammar name"
<sent1>=this <is1> a <test1> of the grammar rules.#
<is1>=is#
<test1>=test1|exam1|quiz1#
"2nd grammar name"
<sent2>=this <is2> a <test2>. |this is an <test2-1>.#
<is2>=is#
<test2>=test|quiz#
<test2-1>=exam#
"3rd grammar name"
<sent3>=this <is3>a <test3>.#
<3is >=is 3#
<test3>=test|exam#
"4th grammar name"
<sent>=Die Kuh springt <prep> den Hund.#
<prep>=uber#

In this example, "first grammar name" specifies the beginning of a set of grammar rules, as does "2nd grammar name" and the rest of the lines delimited with quotes. The lefthand side of each production rule is a sequence of characters delimited by <and >, respectively. The = symbol is the replacement metasymbol and alternative replacement strings are delimited by |.

The data in the re-edited grammar file can be transformed into a data structure for use with a random sentence generator. The random sentence generator can use a random number generator to select from the alternative replacements from each production. The terminal symbols of each sentence can be defined words in a re-edited dictionary document. The generated sentences can be written to a new re-edited document. As the new re-edited document is generated, those attributes associated with dictionary words used to generate the random sentences automatically can be attached to the text in the new re-edited document thus allowing students to select the generated sentences to listen to attached sounds.

As the grammar file can be created with the re-editor of the present invention, different fonts and symbols and other re-editor features can be used in generating sample sentences. Other metasymbols further can be used within the replacement rules. For example, any character string delimited by \ would generate underlines:

<sent>=¡El perro <\grande\[big]>corre rápido!

This production rule would generate the sentence:

¡El perro ______[big] corre rápido!

The underlined text area is generated from \grande\ and could be a user text input area that the end user is to fill in. In this case, 'big' specifies the English word that is to be translated by the end user into Spanish. This generated sentence could be attached to a sequence of text in a separate REdit answer file: ¡El perro grande corre rápido! By activating the attached text attribute, the user could then see the correct sentence in the REdit answer file.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a method and system for adapting textual documents into re-editable multimedia documents. In accordance with the inventive arrangements, a multimedia re-editor can annotate a pre-configured textual document with links to multimedia elements, for example audio objects, video objects, graphics, additional textual links and interactive multimedia components, including user input fields and user speech recording, user sound recordings and playback fields. Importantly, the added annotations can be stored in a file which remains separate from the textual document. In this way, the textual document can be freely edited in any suitable text editor without disturbing the multimedia annotations. That is, edits to the underlying textual document can be accounted for in the separate annotations. Still, a multimedia attribute editor can be further provided to ensure the synchronization between the annotations and any changes to the underlying textual document.

Figure 1:
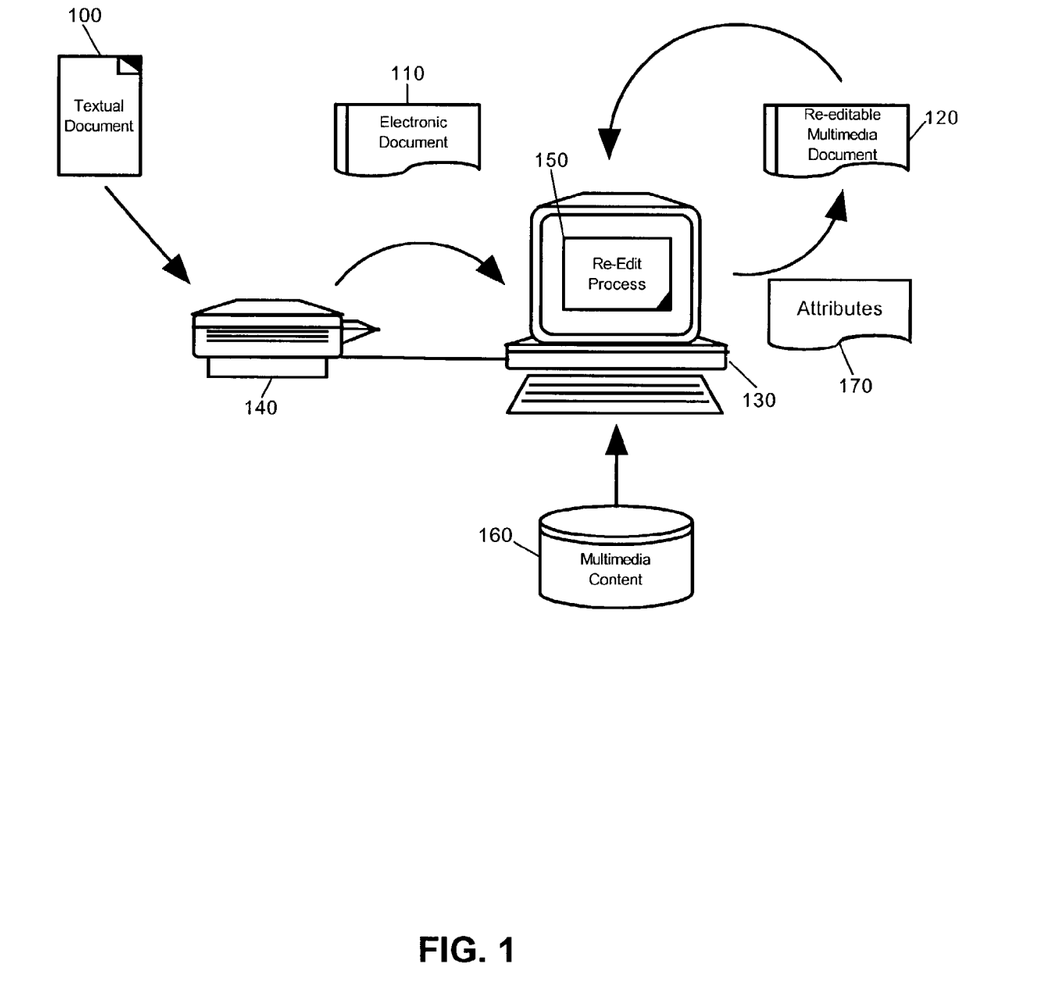
FIG. 1 is a schematic illustration of a system for adapting textual documents into multimedia documents.

FIG. 1 is a schematic illustration of a system for adapting textual documents into multimedia documents. The system can include a computing device 130 configured to host conventional computer software applications, such as the re-editor 150 of the present invention. As shown in FIG. 1, textual documents 100 can be provided in electronic form 110 to the multimedia re-editor 150. Where the textual documents 100 are embodied in print form, an optical scanner 140 can be used to convert the textual document 100 into a suitable electronic form 110.

The multimedia re-editor 150 can process the electronic form of the textual document 110 into a re-editable multimedia document 120 by annotating the electronic document 110 with references to multimedia content 160. Specifically, the multimedia re-editor 150 can create a separate file containing annotations linked to relative locations in the electronic document 110. Examples of multimedia content 160 can include sound files and portions thereof, video clips, graphics files, text files, and interactive multimedia objects, such as user record fields and user text fields. Subsequently, the re-editable multimedia document formed from the combination of the electronic text file 120, the attributes file 170 and the referenced multimedia content 160 can be viewed through an interpreter configured to present the re-editable multimedia document 120 in conjunction with the attributes file 170.

Importantly, because the annotations are not embedded in the electronic document 110, but are stored in a separate file, the multimedia work created by the process can be viewed as a "re-editable" multimedia document 120. More particularly, inasmuch as the multimedia annotations are physically separate from the underlying textual work, but are logically processed as a single work, pre-existing textual works can be enhanced with multimedia elements. For example, pre-existing textual works stored on an optical disk such as a CD-ROM or DVD can be enhanced with multimedia elements though the pre-existing textual works themselves cannot be modified in place. Thus, the multimedia "re-editing" of an existing textual work can revitalize the utility of the underlying textual work.

Figure 2:
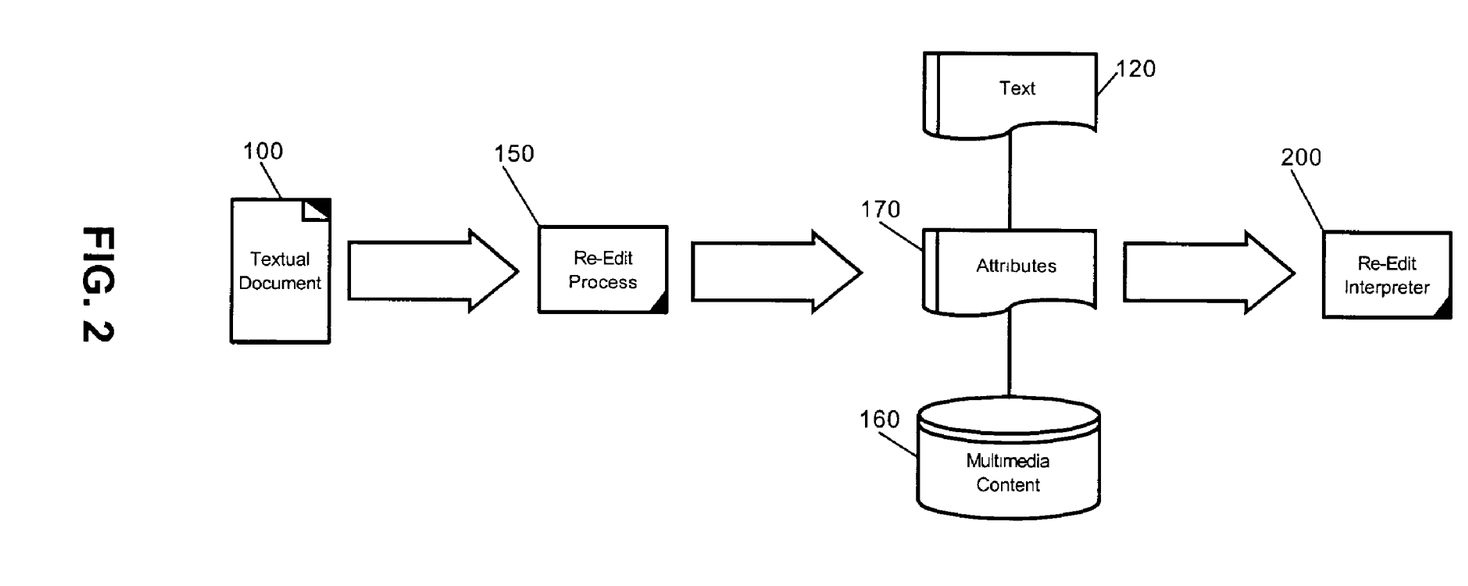
FIG. 2 is a block illustration of a process for adapting a textual document into a re-editable multimedia document.

FIG. 2 is a block illustration of a process for adapting a textual document into a re-editable multimedia document. Initially, a pre-existing textual document 100 can be provided in electronic form to the multimedia re-editing process 150 of the present invention. For example, a text-based language instruction lesson book can be optically scanned and converted into an electronically processable document or created with a document processor. As another example, a text-based formal logic course book can be optically scanned and converted into an electronically processable document. In any case, however, the invention is not merely limited to the optical scanning of printed materials and the pre-existing textual document 100 also can be an originally electronic document, or other conversion means can be applied to convert the pre-existing textual document 100 to an electronic form.

Once provided to the multimedia re-editing process 150, a separate attributes file 170 can be created to coincide with an electronic text file 120 containing the underlying content of the textual document 100. The attributes file 170 can contain logical links to multimedia content 160, for example audio files, video files, text files and the like. Preferably, each logical link can have a reference to a relative portion of the electronic text file 120. For example, each attribute stored in the attributes file 170 can be represented by a data structure having data members defining the starting position of the link and the ending position of the link in the electronic text file 120. Thus, the logical links can remain aligned notwithstanding changes to the electronic text file 120 through a simple realignment process.

Additionally, the data structure can include one or more additional data members for storing information regarding the multimedia content 170, for instance the directory or network location of an audiovisual file, a descriptive string, an activating key, etc. Hence, an exemplary attribute data structure follows:

```
class myAttribute
{
    long Start;
    long End;
    String Info     // Info can include type, function-key, status-bar-label,
                    // filename, audioCD title, track, start-play-time,
                    // start-play-end, and/or options
}
```

Notably, in one aspect of the invention, the attributes file 170 can be an array of attribute objects streamed to fixed storage, along with other information about fonts and the like.

The multimedia re-editor of the present invention can facilitate the creation of multimedia works in which external multimedia elements can be activated simply through the activation of selected portions of text in a pre-existing textual document. Those multimedia elements can include, but are not limited to sound clips, for instance wave files, MP3 files, MIDI files and portions of an audio CD, video clips, for instance AVI-formatted video files, RealPlayer® video files and the like, and external multimedia elements, such as graphic images, photographs, and external text. Additionally, interactive multimedia elements can be provided, including user recording elements and user input elements.

FIGS. 3A through 3D, taken together, are exemplary screen shots illustrating the operation of a multimedia re-editor which has been configured in accordance with one aspect of the present invention. Beginning in FIG. 3A, an exemplary multimedia re-editor can include the basic GUI components of a traditional software application deployed in a windowing environment. Importantly, the multimedia re-editor can include two modes: a view mode and an edit mode. In edit mode, the multimedia re-editor can be a comprehensive document editor. In that regard, conventional editing features are supported, including cut, copy, paste, insert, delete, etc. Also, the size of the window, in addition to the location and style of the window through which the re-edited document can be viewed can be specified. Importantly, when in the edit mode, the multimedia re-editor can track changes to underlying text and can adjust the logical links in a corresponding attributes file accordingly.

While FIGS. 3A through 3D depict the interpretation of a re-editable multimedia document in the view mode, FIGS. 4A through 4E depict the re-editing of the multimedia document in an edit mode. The multimedia re-editor can include a document viewing component in which the electronic text 310 of a re-editable multimedia document can be viewed. Though the electronic text 310 can include that text originally included as part of a pre-existing textual document, a separately configured attribute file can link portions of the electronic text 310 to multimedia elements.

Figure 3A:
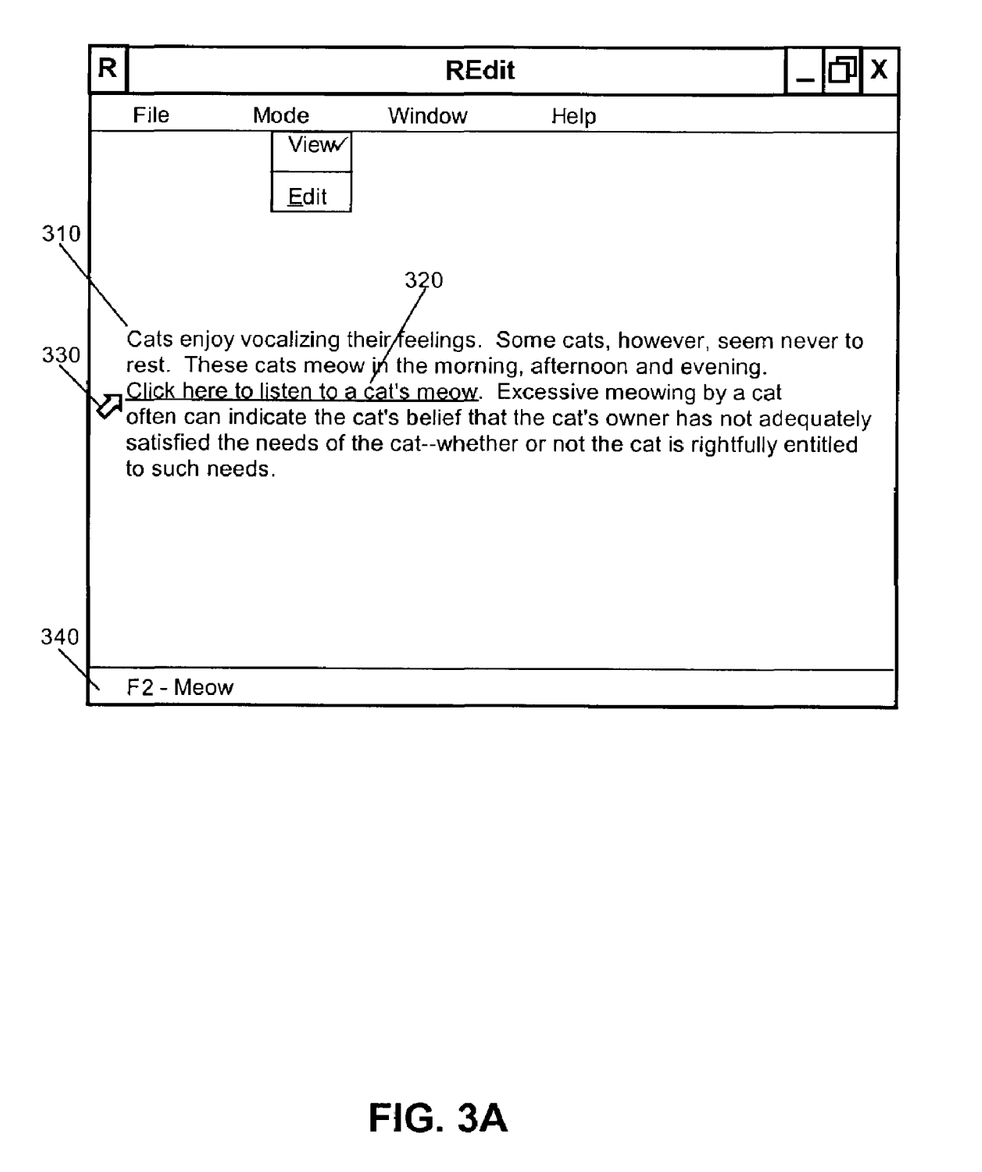
FIGS. 3A through 3D, taken together, are screen shots of the interpretation of the re-editable multimedia document of FIG. 2; and, FIGS. 4A through 4E, taken together, are screen shots of a multimedia re-editor configured to adapt a textual document into the multimedia document of FIGS. 3A through 3D.

For example, as shown in FIG. 3A, the text portion 320, "Click here to listen to a cat's meow" can be linked to a sound file for audibly presenting a recording of a cat's meow. Thus, when an end-user selects the text portion 320 using the pointing device 330, the multimedia re-editor can cause the sound file to play through an associated audio playback device. Notably, the status bar 340 can indicate a function key to depress to play the cat's meow sound when the caret is located in the text area associated with the sound. Furthermore, the playback speed of the sound file can be configured in a conventional manner, as is well known in the art. Finally, a user-record area can be optionally associated with the text portion 320.

Figure 3B:
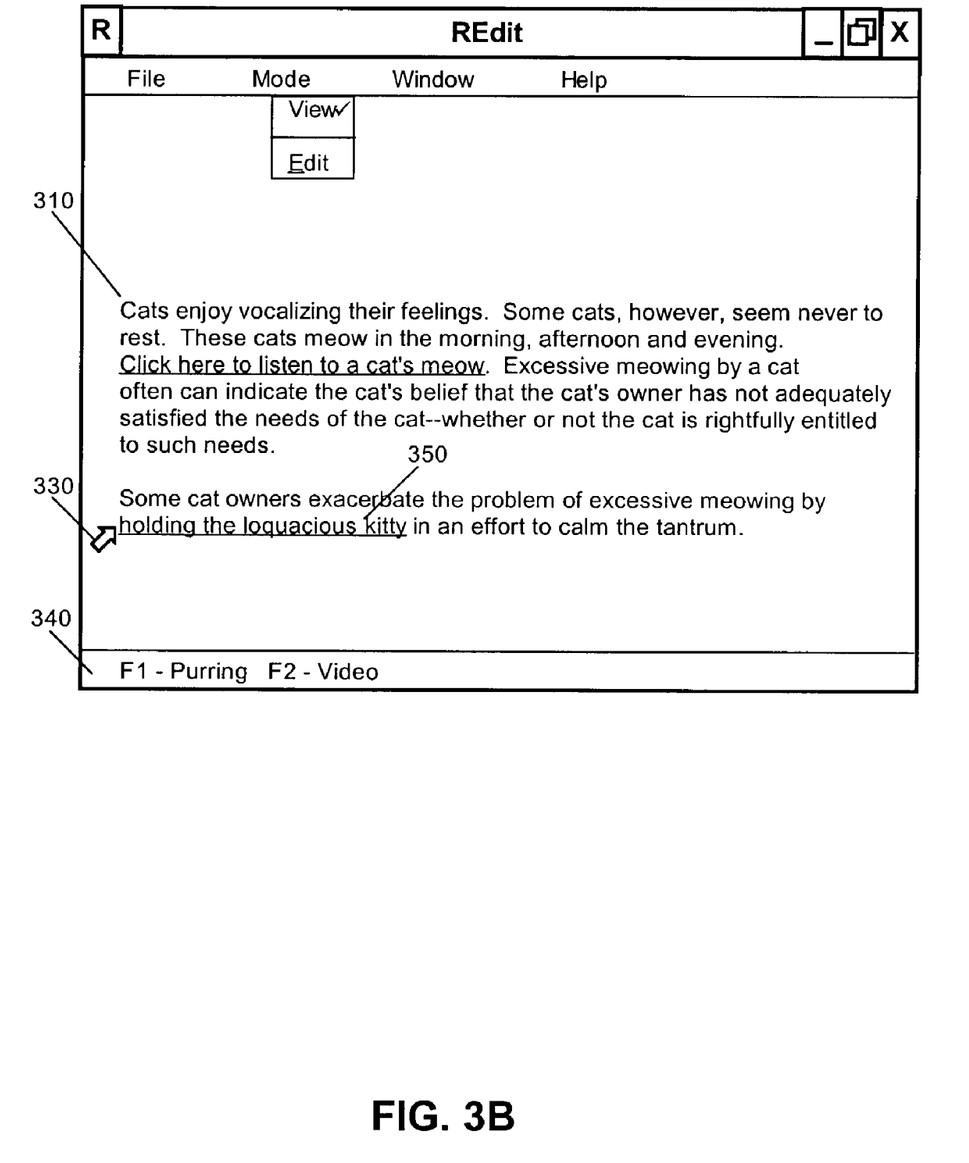

FIG. 3B further illustrates the presentation of multimedia elements associated with (but not embedded within) the electronic text 310. Notably, as shown in FIG. 3B, the text portion 350, "holding the loquacious kifty" can be linked both to audio and video multimedia elements. In that regard, the status bar 340 can so indicate that striking the F1 function key will result in the audio playback of a sound clip of a cat purring, and striking the F2 function will result in the video playback of a video clip of a cat owner holding a cat. Of course, selecting the text portion 350 with the pointing device 330 will cause both the audio and video playback of the sound and video clips.

Figure 3C:
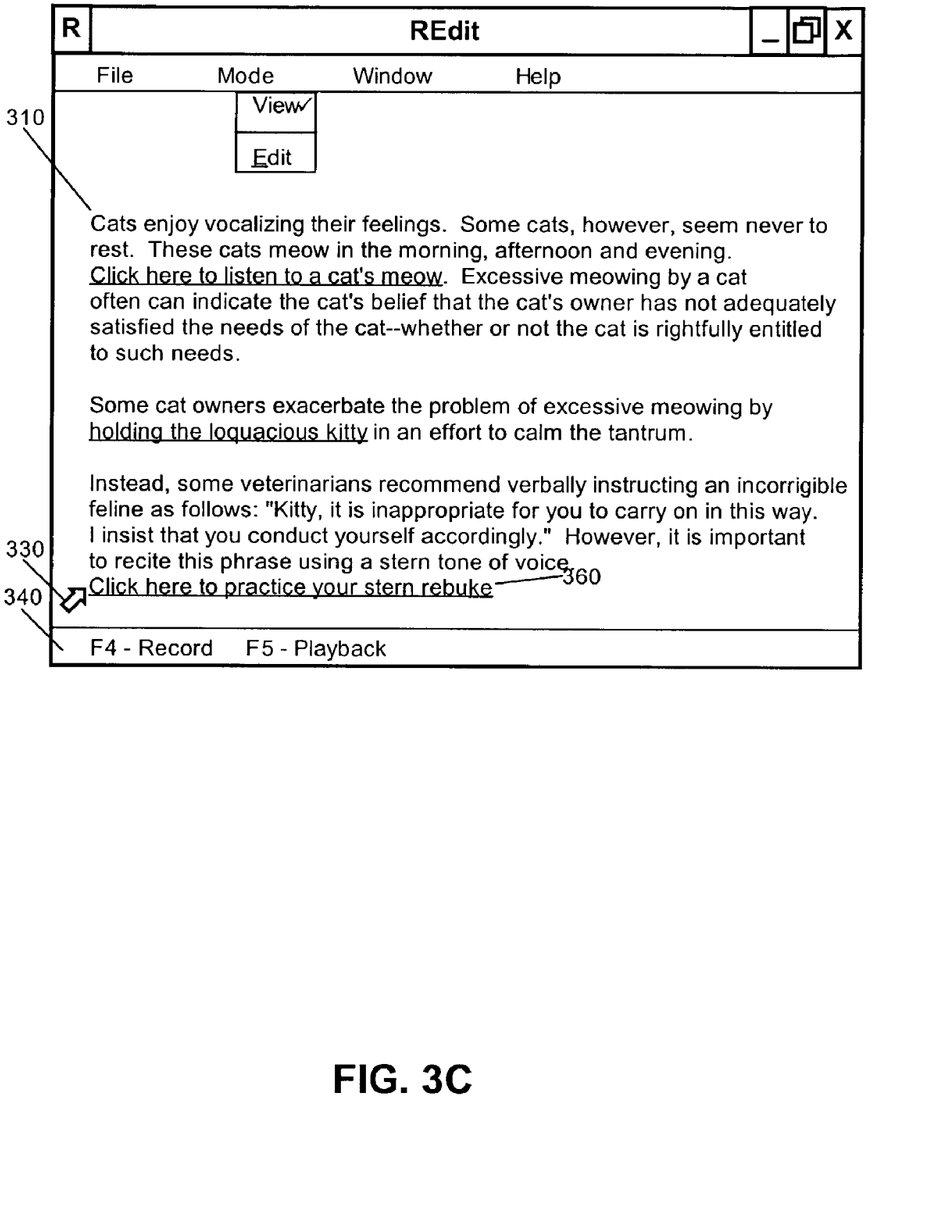

FIG. 3C illustrates the inclusion of an interactive multimedia element in the text 310 of the pre-existing textual document. Specifically, as shown in FIG. 3C, the selection of the text portion 360, "Click here to practice your stern rebuke", pressing the F4 function key can cause the multimedia re-editor to record the end-user's speech. Furthermore, as shown in status bar 340, the selection of the F4 function key also can initiate the re-recording of the end-user's speech while the F5 function key can cause the playback of the recorded portion of the end-user's speech.

As will be apparent to one skilled in the art, the association of the selected portion of text 360 with the interactive multimedia element can dramatically enhance the utility of certain textual documents including printed language pronunciation materials. For example, a Germanic languages instruction booklet can prove to be a highly effective language learning tool when combined with the pronunciation feedback afforded by the addition of an interactive multimedia element. Similarly, in the example shown in FIG. 3C, the end-user can verify the "sternness" of the rebuke by listening to the recording of the end-user's stern rebuke.

Figure 3D:
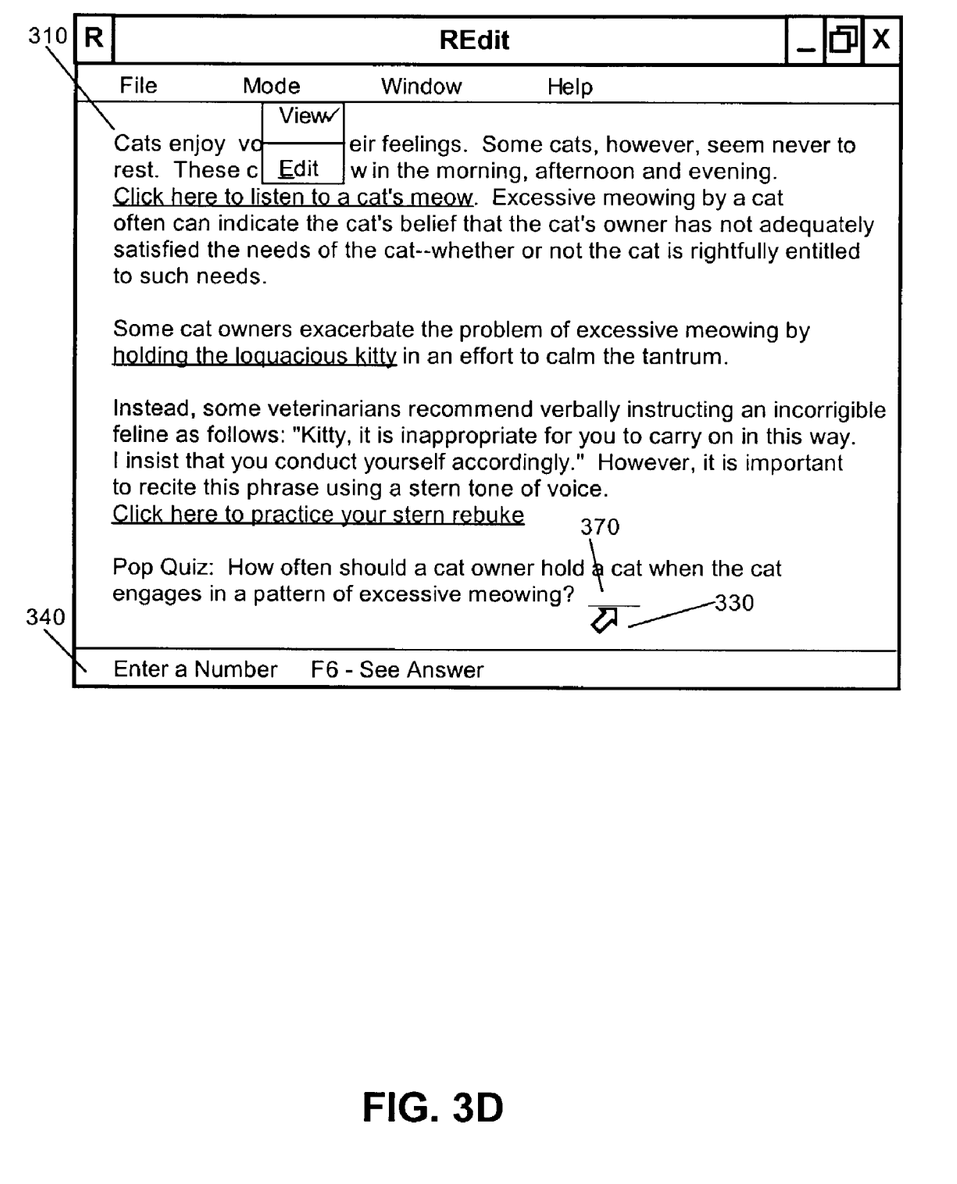

FIG. 3D illustrates the incorporation of yet another interactive multimedia element—the user input field. Specifically, the selected text portion 370, "How often should a cat owner hold a cat when the cat engages in excessive meowing?" of the electronic text 310 can include an associated text input field into which the end-user can respond to the posed question. Notably, as shown in the status bar 340, the end-user can be prompted for data input, for instance through a keyboard. Furthermore, the end-user can view a suggested response stored in the same or another re-edited file by depressing a corresponding function key.

As one skilled in the art will recognize, the text input field interactive multimedia element can be an effective addition to pre-existing textual documents. In that regard, existing informational materials can be converted to classroom teaching tools through the addition of quiz questions pertaining to the informational materials. Similarly, dynamic feedback can be collected based upon the end-user's reading of a document which includes associated user input fields.

Though not shown, other types of multimedia elements can be presented in the multimedia re-editor of the present invention. For example, external text files can be linked to selected portions of an underlying textual document. In fact, selected ranges of text from the external text files can be linked to the selected portions in the same manner as selected ranges of an audio file can be linked to selected portions of the underlying textual document. For instance, a selected portion of an underlying textual document can include a phrase presented in a foreign language. When activated, a multimedia link to text including the English language phonetic pronunciation of the selected portion can be provided. Similarly, terms within the underlying textual document can be linked to an internal or external glossary text file or an external help file.

Other examples of multimedia elements which can be included, but are not shown in FIGS. 3A–3D can include the linking of externally executable programs or scripts to selected portions of an underlying textual document. For instance, where the underlying textual document is a lesson book in formal logic, a logic transformation program can be linked to a user input field to test the validity of a student provided proof. In any case, the invention is not limited merely to the multimedia elements shown and the multimedia re-editor can enhance an underlying textual document with other multimedia elements not discussed herein in the same manner as those multimedia elements previously discussed.

FIGS. 4A through 4E, taken together, are screen shots of the multimedia re-editor when configured to adapt a textual document into the multimedia document of FIGS. 3A through 3D. Beginning in FIG. 4A, in one aspect of the present invention, the multimedia re-editor when placed in an edit mode can provide an interface for enhancing an underlying textual document with sound, video, text, user recording areas, and user text input areas. Additionally, when re-editing a re-editable multimedia document, existing multimedia attributes can be edited to accommodate both changes to the underlying textual document and changes to the existing multimedia elements.

Figure 4A:
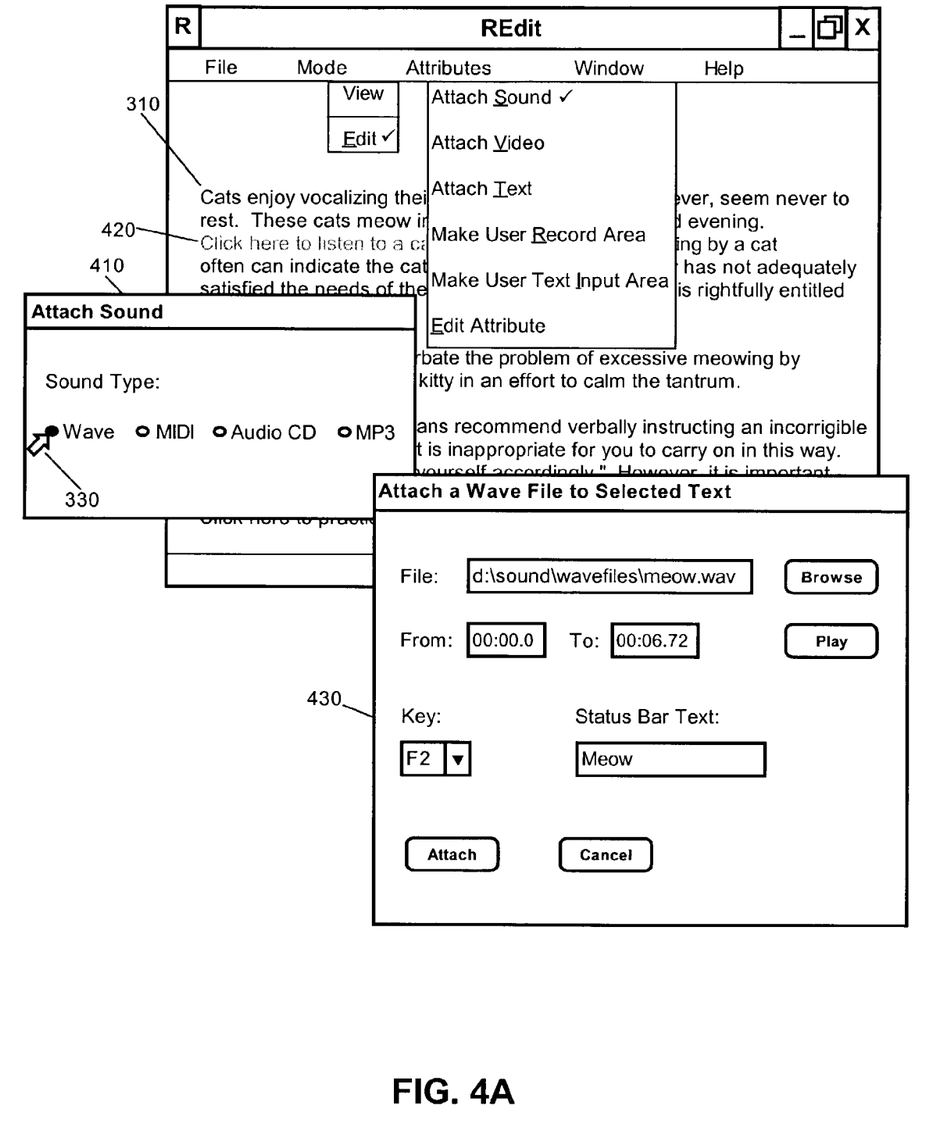

As shown in FIG. 4A, a sound file can be linked to the selected text portion 420 of the underlying text 310 by selecting the "Attach Sound" sub-menu choice in the Attributes menu. Upon selecting the "Attach Sound" sub-menu choice, an Attach Sound dialog box 410 can query the end-user for a specific type of sound file. For instance, in the example shown in FIG. 4A, the sound file can include one of a wave file, MIDI file, Audio CD file or MP3 file, though the invention is not limited to the particular format of sound files which can be linked to the selected portion 420.

Once the user has selected a sound file type, an additional dialog box 430 can prompt the user for a file path and name. Moreover, in some sound file formats such as the wave file format, the user can provide a range of the sound file defining a portion which should be linked to the selected text portion 420. Finally, the playback of the sound file can be linked to a function key and text can be provided which will be displayed in the status bar when the end-user passes the caret over the selected text portion 420. Notably, using the information provided in the additional dialog box 430, a suitable multimedia attribute data structure can be constructed with which the sound file can be processed and played back using commercially available audio file retrieval and playback technologies, as is well known in the art.

Significantly, though not shown in FIG. 4A, in another aspect of the present invention, multiple sound files can be linked to the same selected portion of text in the underlying textual document. Each sound file can be activated separately by function key. As will be apparent to one of ordinary skill in the art, by linking multiple sound files to a selected portion of text, unique language instruction applications can be provided, including the demonstration to a foreign language student of the varying ways to pronounce a textual phrase according to different dialects or transversely, the English translation.

Figure 4B:
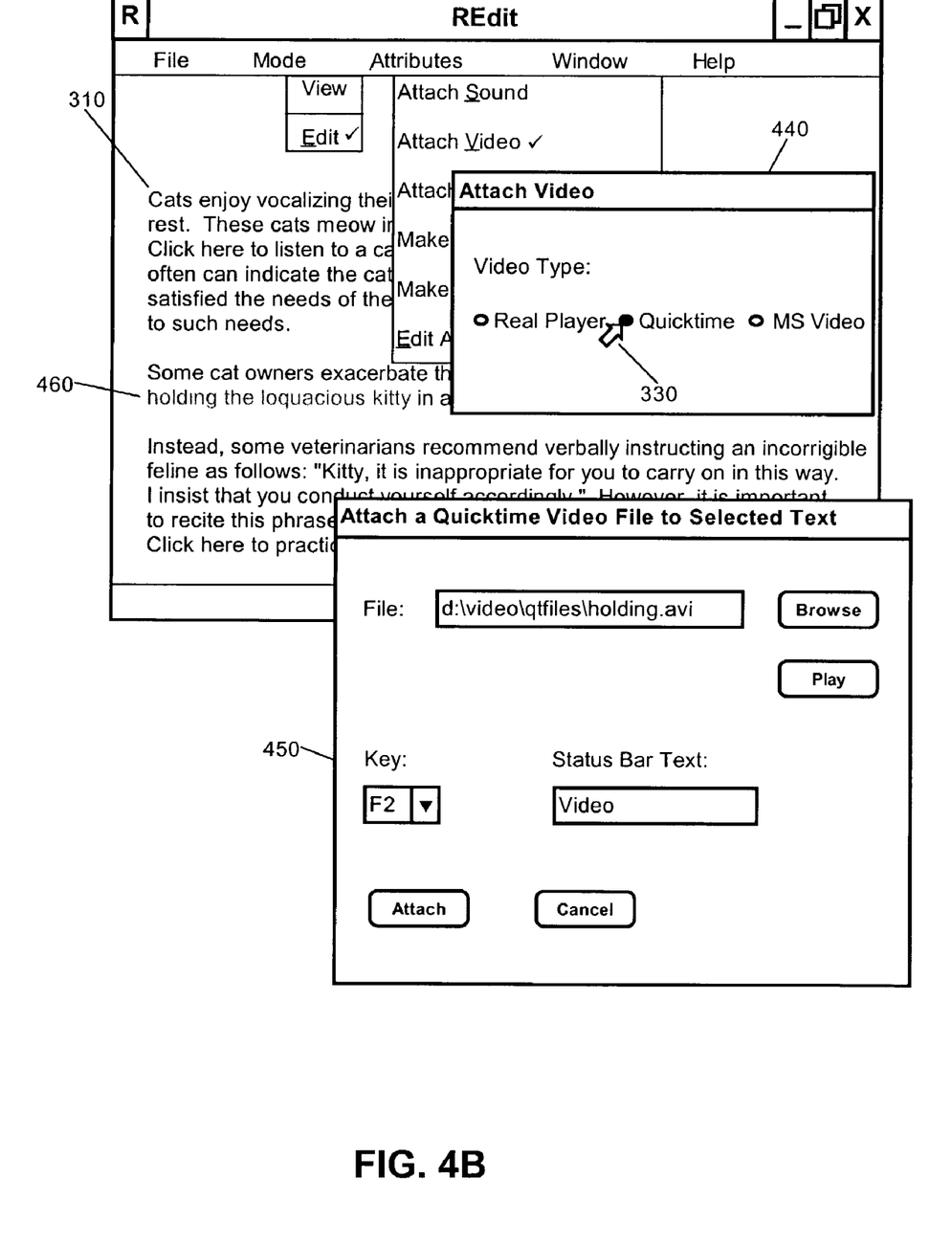

Similar to the attachment of a sound file, as shown in FIG. 4B, a video file can be linked to the selected text portion 460 of the underlying text 310 by selecting the "Attach Video" sub-menu choice in the Attributes menu. Upon selecting the "Attach Video" sub-menu choice, an Attach Video dialog box 440 can query the end-user for a specific type of video file. For instance, in the example shown in FIG. 4B, the video file can include one of a Real Player file, Quicktime file, or Microsoft Video file, though the invention is not limited to the particular format of video files which can be linked to the selected portion 460.

Once the user has selected a video file type, an additional dialog box 450 can prompt the user for a file path and name. Also, as in the case of the attachment of a sound file, the playback of the video file can be linked to a function key and text can be provided which will be displayed in the status bar when the end-user passes a pointer over the selected text portion 460. Notably, using the information provided in the additional dialog box 450, a suitable multimedia attribute data structure can be constructed with which the video file can be processed and played back using commercially available video file retrieval and playback technologies, as is well known in the art.

Figure 4C:
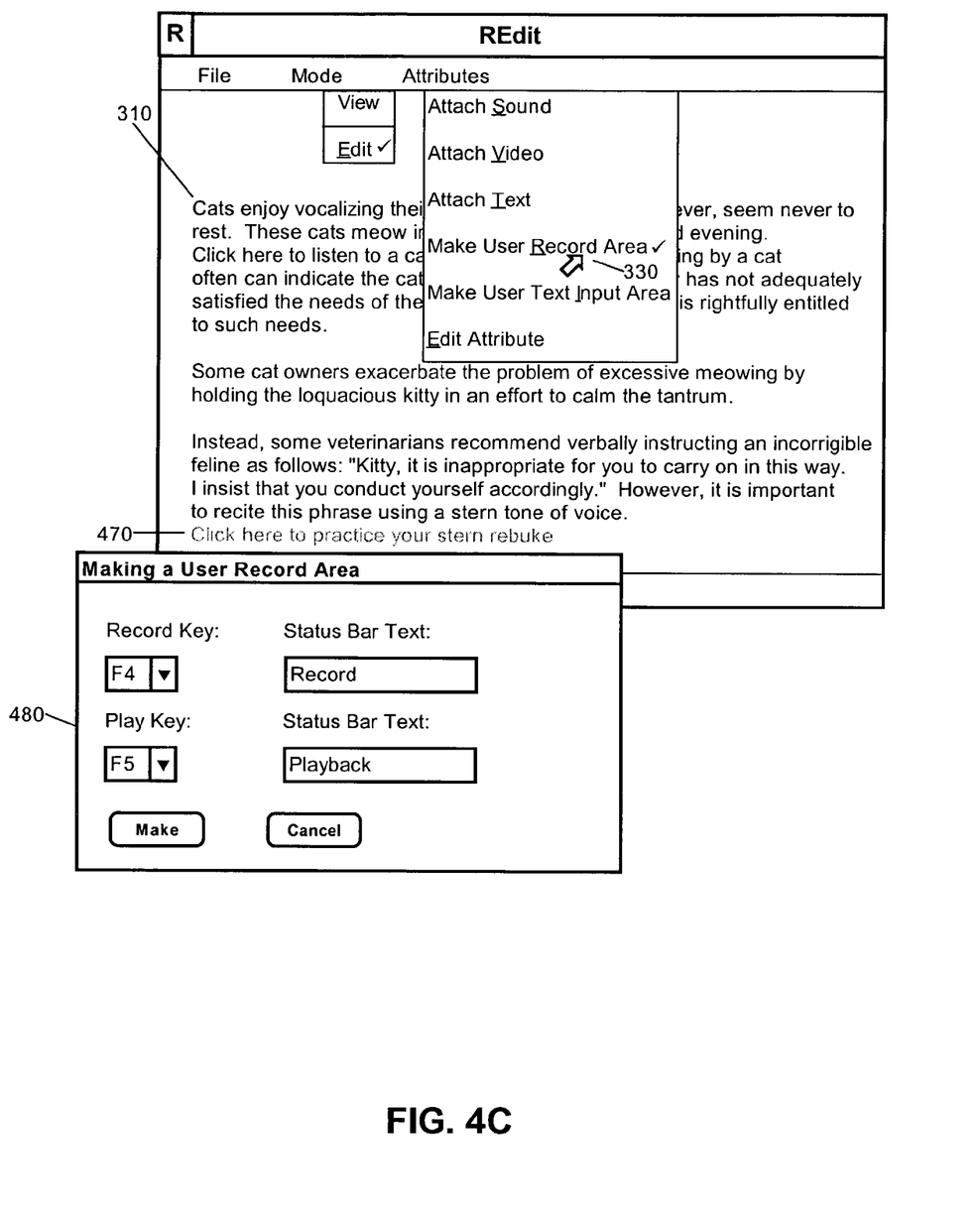

FIG. 4C illustrates the advantageous linking of a user recording area to a selected text portion 470 of the underlying textual document 310. Specifically, upon selecting the sub-menu choice, "Make User Record Area", a Make User Record Area dialog box 480 can prompt the end-user for a function key which when depressed can begin the audio recording process. In addition, the Make User Record Area dialog box 480 can prompt the end-user for a function key which when depressed can playback the recorded audio. In both cases, status bar text can be defined for each function key.

In operation, when an end-user selects the selected text portion 470 of the underlying text document 310, the status bar text can be displayed and, responsive to the selection of the specified function key, a conventional audio recording device such as that supplied with an ordinary windowing operating system can begin an audio recording process. When complete, the recorded audio can be played back responsive to the selection of the specified function key. In any case, as one skilled in the art will recognize, the linking of the user recording area to selected portions of an underlying textual document can enhance the document, transforming the document from plain-vanilla text to a fully-interactive multimedia experience.

Possible applications include not only language instruction, but also public speaking preparation, spoken data collection, etc. Also, where a video camera attachment is available, the identical process can be performed for a "Make User Video Recording Area" using commercially available WebCam recording and playback technologies. Again, possible applications include not only language instruction, but particularly public speaking preparation and spoken data collection.

Figure 4D:
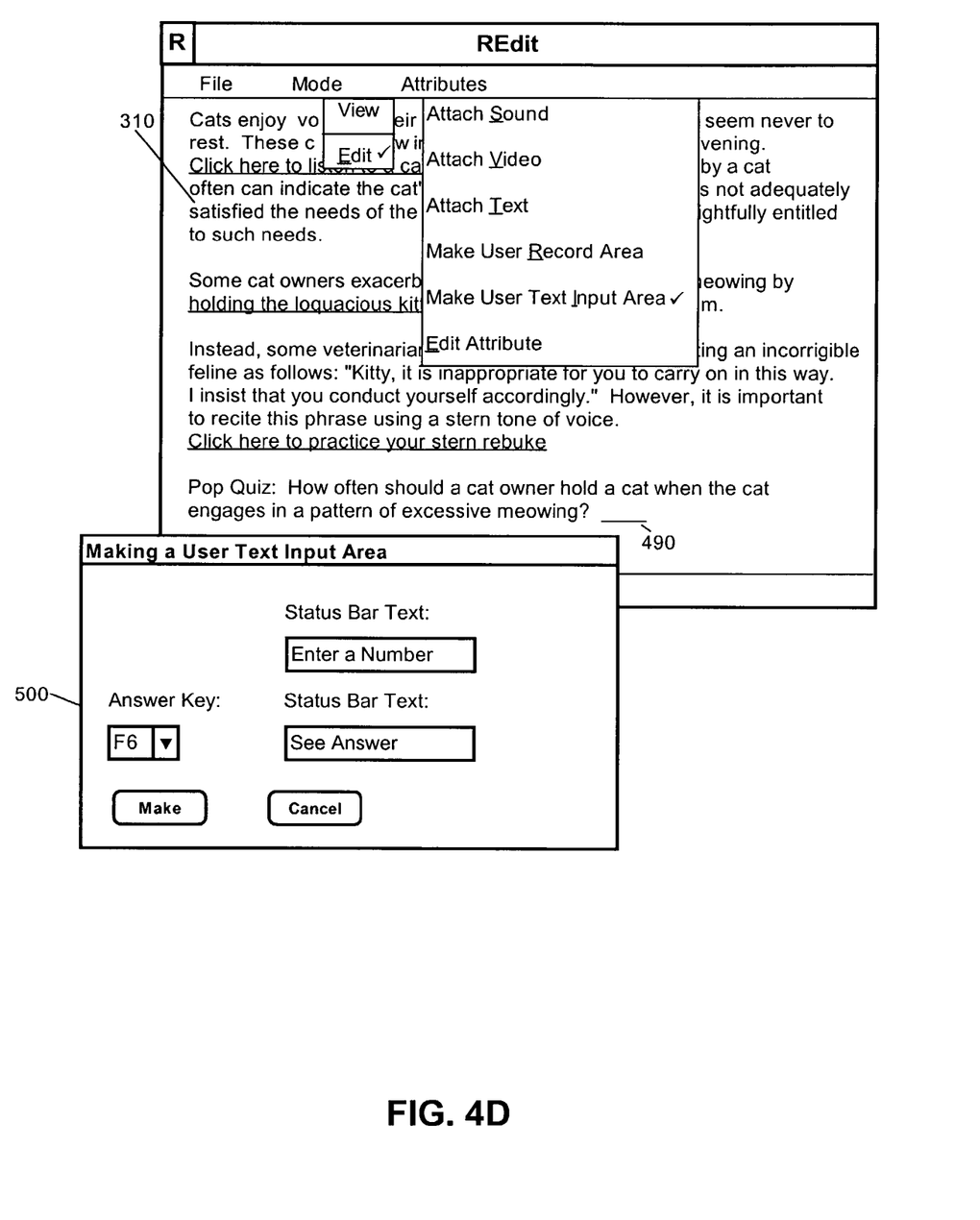

FIG. 4D illustrates the linking of a selected text portion 490 of an underlying textual document 310 with a user text input area. In particular, as shown in FIG. 4D, upon selecting the sub-menu choice, "Make User Text Input Area", a Make User Text Input Area dialog box 500 can prompt the end-user for text to be displayed in the status bar when an end-user passes the caret in proximity to the selected text portion 490. The status bar text can be used to prompt the user for input. The Make User Text Input Area dialog box 500 also can prompt the end-user for a function key which when depressed can provide textual feedback. Finally, the Make User Text Input Area dialog box 500 can prompt the end-user for status bar text defining the operation associated with the function key.

Possible applications of the user text input area include not only interactive textbook instruction, but also data collection and data analysis. Furthermore, the user text input area can be combined with audio and video file linking, text file linking or external program linking to provide an even further enhanced interactive experience. Specifically, using the text input, an external program can be invoked to process the user provided text. The results of the external program can be passed to a text file which can be audibly or visually presented to the user using text-to-speech technology, for instance.

Figure 4E:
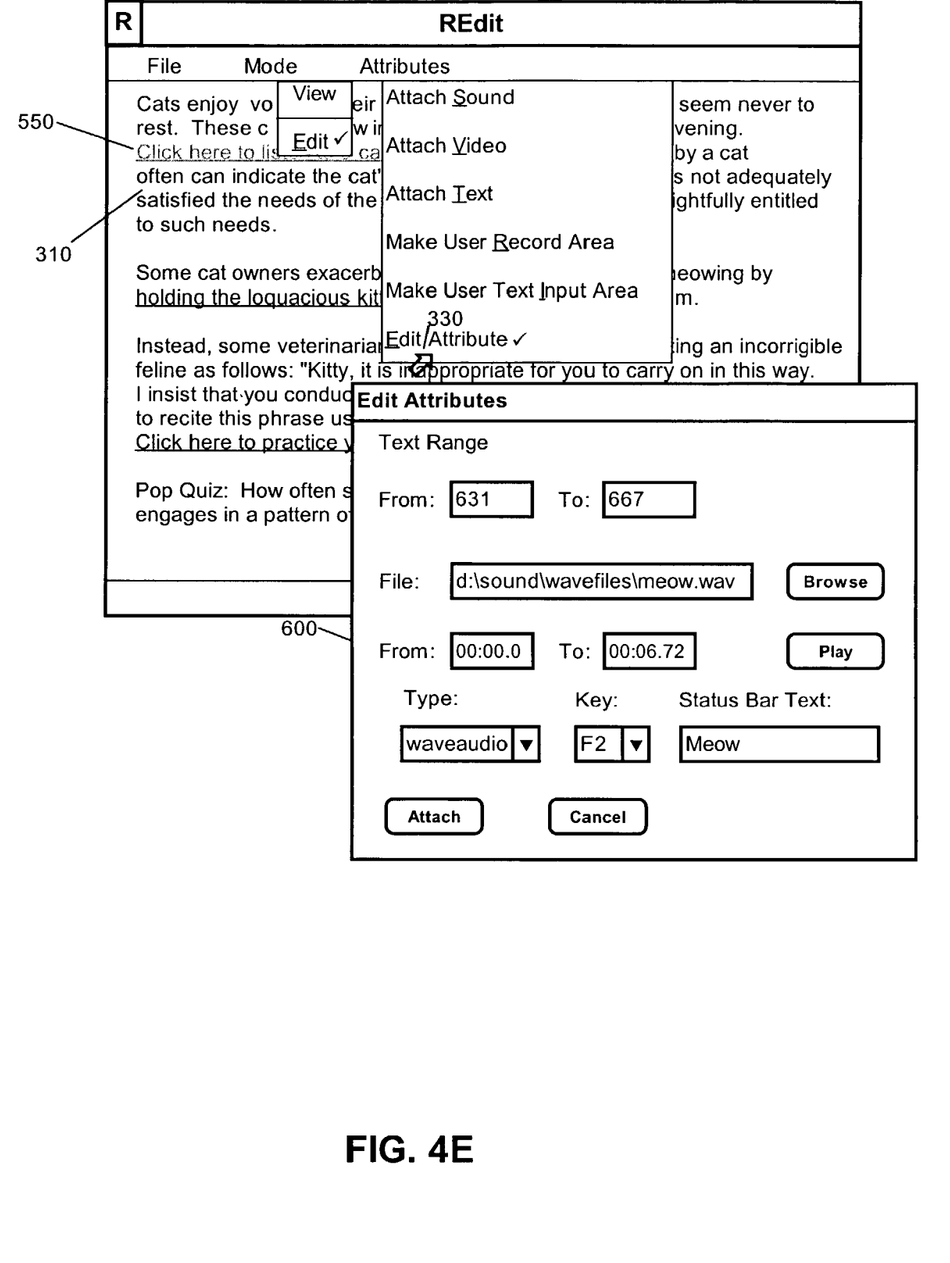

Importantly, once an underlying textual document has been transformed into a re-editable multimedia document, subsequently the attached multimedia attributes can be edited through the "Edit Attribute" sub-menu choice as shown in FIG. 4E. In particular, in many cases the underlying textual document 310 can change. Inasmuch as the attributes file storing the links between multimedia attributes and selected text portions of the underlying textual document 310 are based upon the relative positioning of the selected text portions in the underlying textual document 310, changes to the underlying textual document 310, including insertions, deletions and the like, can invalidate the links between the multimedia attributes and their associated selected textual portions.

In consequence, the Edit Attributes dialog box 600 can be used to edit the configuration of an attached multimedia attribute. In operation, when an end-user selects a portion of text 550 and activates the Edit Attributes dialog box 600, the data structure corresponding to the selected portion of text 550 can be loaded and the contents presented in the Edit Attributes dialog box 600. Typical multimedia attributes can include not only a file name or path of a linked multimedia element, but also a multimedia element type such as a wave formatted sound file, a rich text formatted text file, or a Quicktime video file. Other multimedia attributes can include a range specifying only a portion of the linked multimedia element, function keys for activating the linked multimedia element and corresponding status bar text.

Most importantly, the Edit Attributes dialog box 600 can permit the author to modify the position of the selected text portion 550 associated with the linked attribute. In this way, as the position of the selected text portion 550 changes in consequence of edits to the underlying textual document 310, the linked attribute can be re-aligned with the selected text portion 550 whose relative position in the underlying textual document 310 may have changed as a result.

Notably, the present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A multimedia re-editor comprising:
   a text processor configured to read and visually present electronic text contained in a text file;
   a multimedia attribute associator configured both to associate selected portions of said electronic text with separately stored multimedia elements, and also to store said associations in an attribute file which is separate from said text file; and,
   a multimedia processor configured to invoke multimedia elements associated with activated ones of said selected portions of said electronic text, said multimedia processor determining which multimedia elements to invoke based upon said associations in said attribute file,
   said selected portions of said electronic text remaining available for visual display after invoking at least one of said multimedia elements.

2. The multimedia re-editor of claim 1, wherein said text processor is a read-only text processor configured to read and visually present electronic text contained in a text file, but not to permit editing of said electronic text contained in said text file.

3. The multimedia re-editor of claim 1, wherein said text processor is an editing text processor configured to read, visually present, and edit electronic text contained in a text file.

4. The multimedia re-editor of claim 1, wherein said multimedia attribute associator comprises an interface through which at least one of a sound file, video file, text file, external program, user record area and user text file can be identified for association with said selected porlions of said electronic text.

5. The multimedia re-editor of claim 4, wherein said interface further comprises a configurable range interface element through which a portion of said multimedia elements can be specified for association with said selected portions of said electronic text.

6. A method for processing a re-editable multimedia document comprising the steps of:
   loading an electronic text file;
   associating external multimedia elements with respective selected portions of said loaded electronic text file;
   storing said associations in a separate electronic attributes file; and, responsive to a user-activation of a selected portion of said loaded electronic text file, invoking at least one associated external multimedia element,
   said selected portions of said loaded electronic text file remaining available for visual display after invoking said at least one associated external multimedia element.

7. The method of claim 6, further comprising the steps of:
   optically scanning a printed textual document; and, converting said scanned printed textual document into said electronic text file.

8. The method of claim 6, wherein said invoking step comprises selectively providing multiple external multimedia elements associated with a respective selected portion of said loaded electronic test file to a user.

9. The method of claim 6, wherein said associating step comprises the step of associating at least one of a sound file, video file, text file, external program, user record area and user text file with said selection portion of said loaded electronic text file.

10. The method of claim 6, wherein said associating step comprises specifying a portion of said at least one external multimedia element with said selected portion of said loaded electronic text file.

11. The method of claim 6, wherein said loaded electronic text file comprises foreign language instruction text.

12. The method of claim 11, wherein said printed textual document comprises a printed foreign language instruction text.

13. The method of claim 6, wherein said loaded electronic text file comprises formal logic instruction text.

14. A machine readable storage having stored thereon a computer program for processing a re-editable multimedia document, said computer program comprising a routine set of instructions for causing the machine to perform the steps of:
   loading an electronic text file;
   associating external multimedia elements with selected portions of said loaded electronic text file;
   storing said associations in a separate electronic attributes file; and, responsive to a user-activation of a selected portion of said loaded electronic text file, invoking at least one associated external multimedia element,
   said selected portion of said loaded electronic text file remaining available for visual display after invoking at least one of said multimedia elements.

15. The machine readable storage of claim 14, wherein said loading step comprises the step of loading said electronic text file from an optical disk.

16. The machine readable storage of claim 14, wherein said associating step comprises the step of associating at least one of a sound file, video file, text file, external program, user record area and user text file with said selection portion of said loaded electronic text file.

17. The machine readable storage of claim 14, wherein said associating step comprises specifying a portion of said at least one external multimedia element with said selected portion of said loaded electronic text file.

18. The machine readable storage of claim 14, wherein said loaded electronic text file comprises foreign language instruction text.

19. The machine readable storage of claim 18, wherein said printed textual document comprises a printed foreign language instruction text.

20. The machine readable storage of claim 14, wherein said loaded electronic text file comprises formal logic instruction text.

21. A method for processing a re-editable multimedia document comprising the steps of:
   creating an electronic dictionary file comprising a plurality of words and corresponding definitions;
   associating external multimedia elements with respective portions of at least one of said words and definitions in said electronic dictionary file;
   storing said associations in a separate electronic attributes file; and,
   responsive to a user-activation of a selected portion of said electronic dictionary file, invoking at least one associated external multimedia element,
   said selected portion of said electronic dictionary file remaining available for visual display after invoking said at least one associated external multimedia element.

22. The method of claim 21, further comprising the steps of:
creating an electronic grammar file comprising a plurality of grammar rules, each said rule comprising a primary term and a plurality of replacement terms;
randomly selecting one of said replacements for each of said grammar rules;
matching said replacements with words from said electronic dictionary file; and,
creating an electronic randomly generated sentence file with sentences generated with said matched words and external multimedia elements associated with said matched words.

\* \* \* \* \*